Feb. 28, 1933.                G. P. BERRY                 1,899,743
                            SLIDE VALVE ENGINE
                         Filed Dec. 13, 1928      4 Sheets-Sheet 4
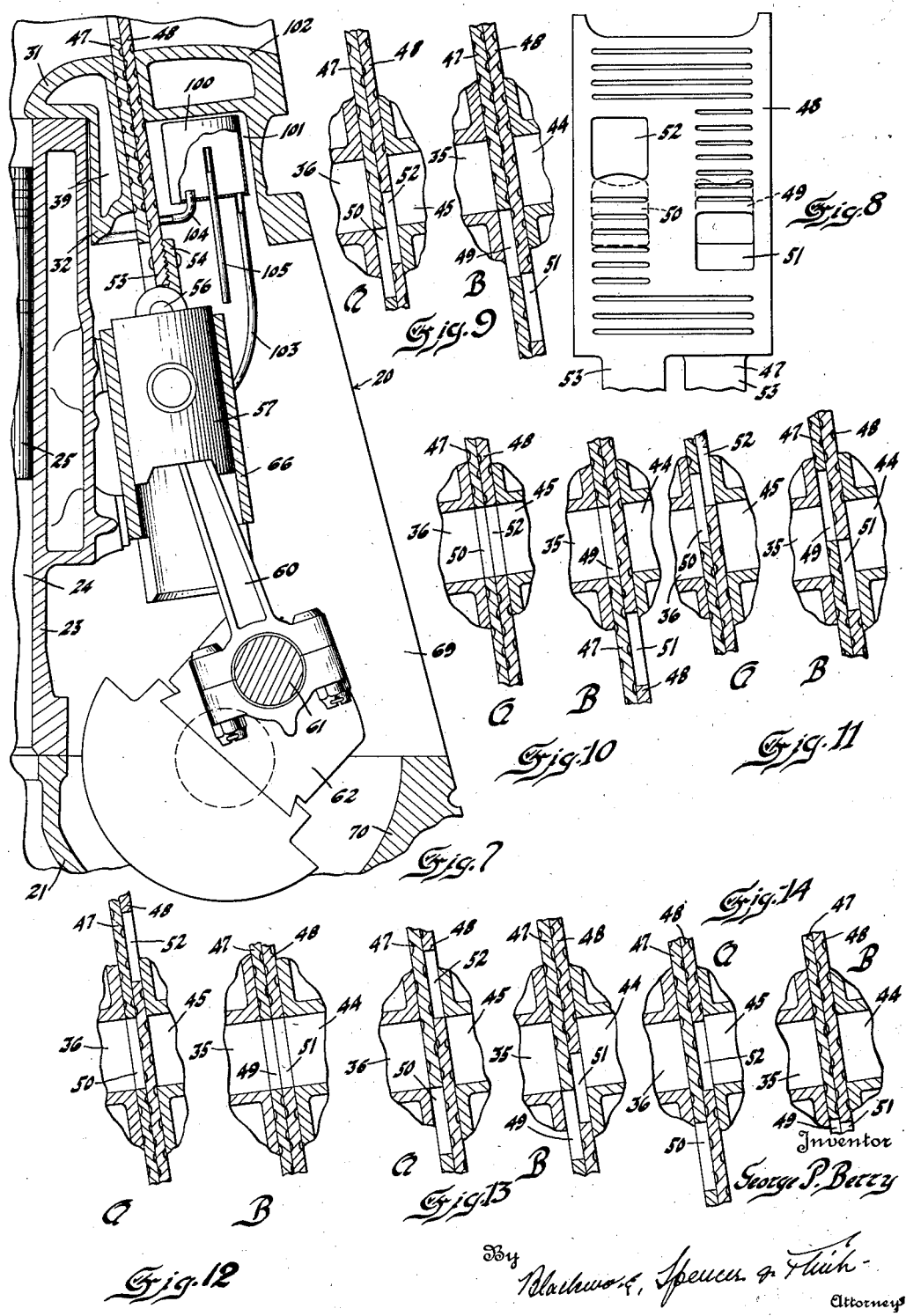

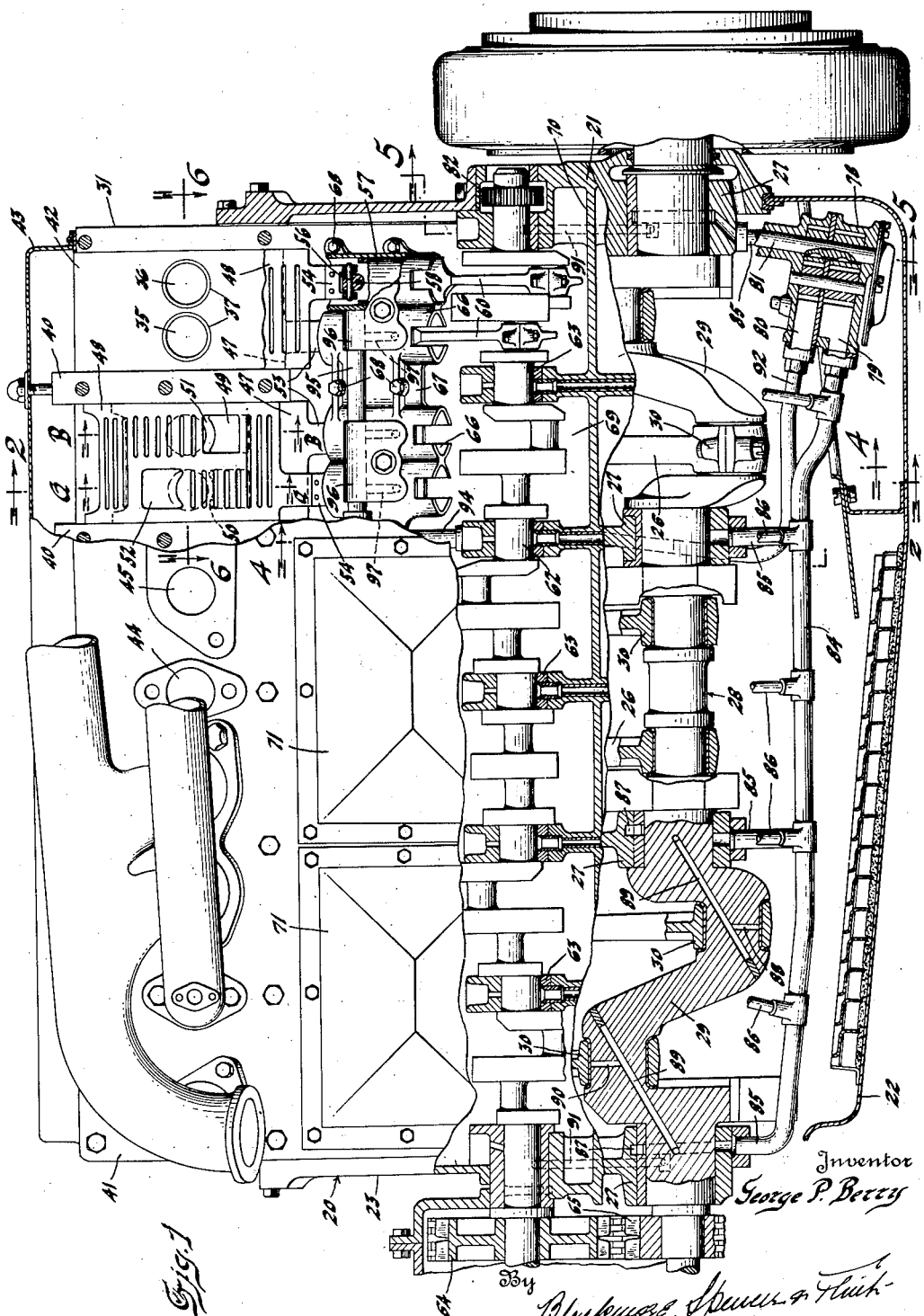

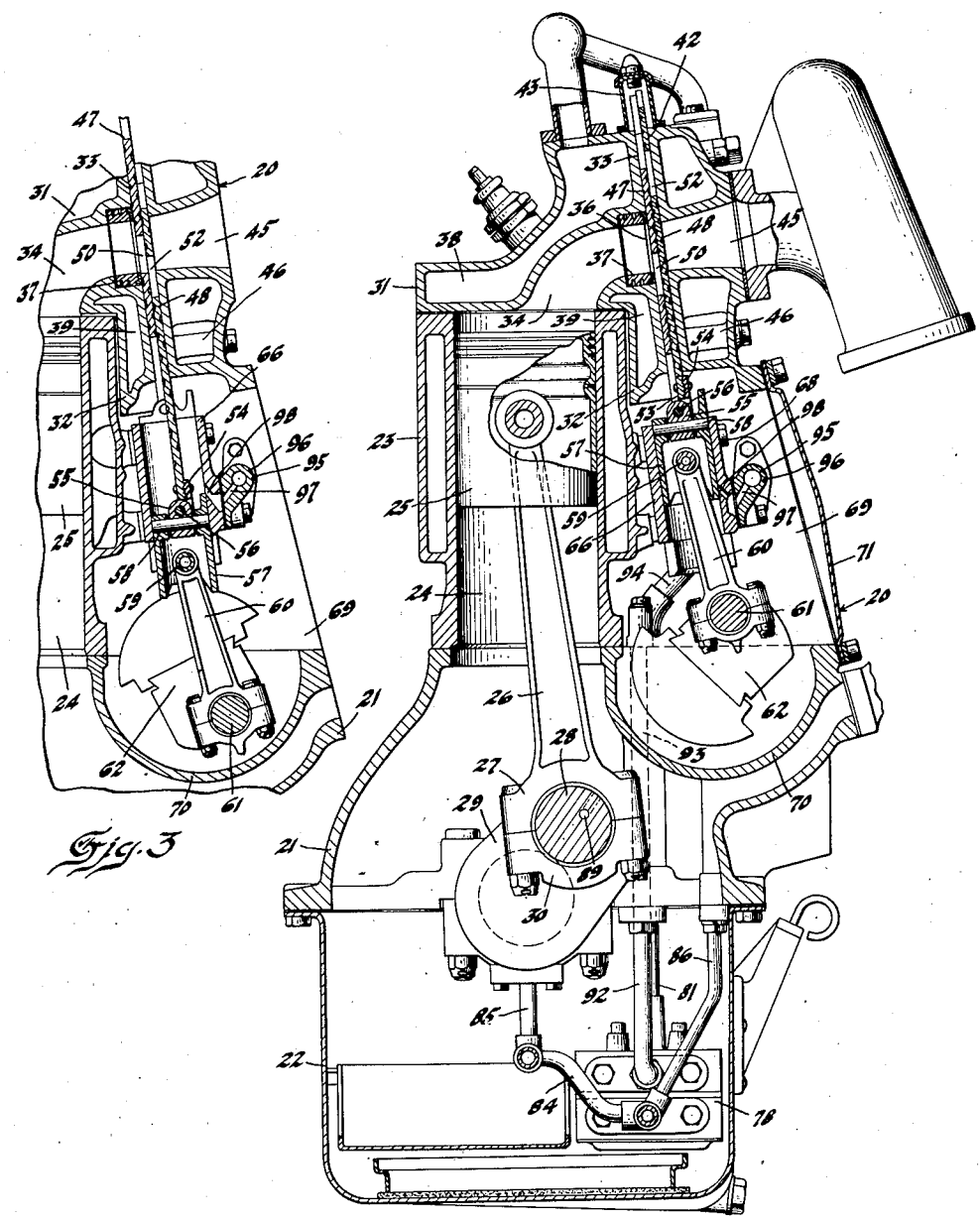

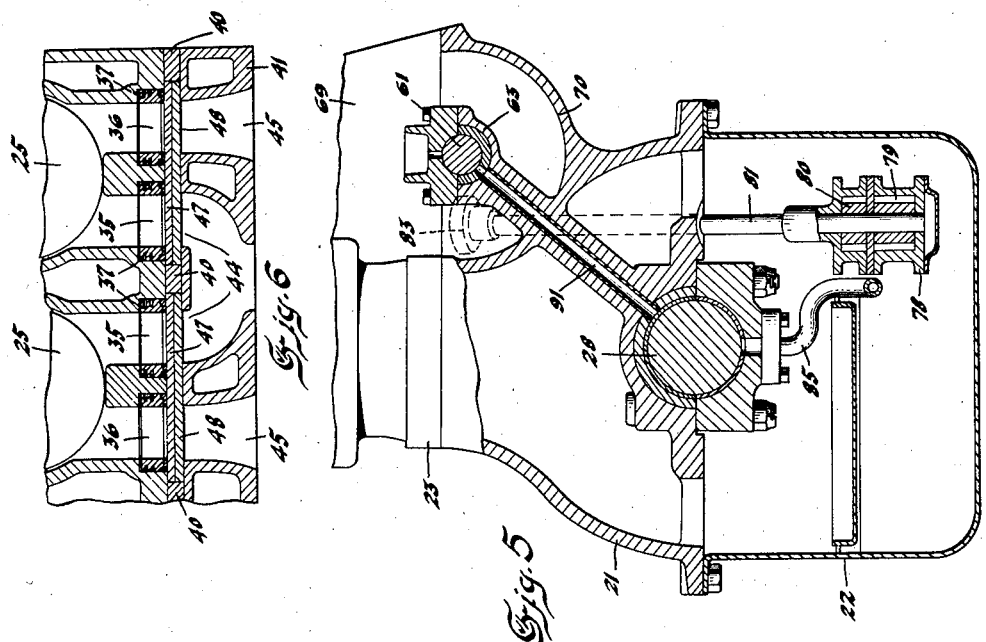

Patented Feb. 28, 1933

1,899,743

UNITED STATES PATENT OFFICE

GEORGE P. BERRY, OF DETROIT, MICHIGAN, ASSIGNOR TO GENERAL MOTORS RESEARCH CORPORATION, OF DETROIT, MICHIGAN, A CORPORATION OF DELAWARE

SLIDE VALVE ENGINE

Application filed December 13, 1928. Serial No. 325,881.

This invention relates to internal combustion engines of the slide valve type, and resides in certain new and useful improvements in or relating to the valves and valve operating mechanism of engines of this type.

One of the features of my invention relates particularly to engines which are provided with adjacent intake and exhaust ports in each cylinder and a single pair of relatively reciprocating ported slide valves for controlling both of the ports in each cylinder, although I apprehend that certain of the principles employed are susceptible of application to engines provided with specifically different types of valve mechanism, and resides in certain improvements in the shaping of the valve ports and the arrangement of the valve ports with relation to the cylinder ports and the valve operating mechanism, whereby the efficiency of the engine is increased.

Another, and an important, feature of my invention, although shown in connection with an engine of the type described above, I apprehend is not limited to such a restricted use, and resides in certain improvements in or relating to the lubricating systems of internal combustion engines and, particularly, the means for lubricating the valves and valve operating mechanism of a slide valve engine.

In the accompanying drawings and the following specification, there is shown and described an internal combustion engine of the slide valve type in which are incorporated the heretofore-mentioned and other features of my invention.

In the drawings:

Figure 1 is a side elevation, with parts broken away and in section, of an internal combustion engine of the slide valve type.

Figure 2 is a section, on the line 2—2 of Figure 1, showing one of the valve crossheads at substantially the upper end of its stroke.

Figure 3 is a fragmentary section, similar to Figure 2, but showing the valve crosshead at substantially the lower end of its stroke.

Figure 4 is a view, with parts broken away and removed, but mainly in section on the line 4—4 of Figure 1, of the engine shown in the preceding figures.

Figure 5 is a view, with parts broken away and removed, but mainly in section on the line 5—5 of Figure 1, of the engine shown in the preceding figures.

Figure 6 is a fragmentary section taken on the line 6—6 of Figure 1.

Figure 7 is a fragmentary transverse section through an engine similar to that shown in the preceding figures but in which is incorporated a modified form of valve lubricating apparatus.

Figure 8 is a view showing a pair of the slide valves in superposed and registering relation and illustrating the relation between a portion of the valve lubricating apparatus shown in Figure 7 and the valves at a certain period in their operation.

In Figure 9, views "A" and "B" are enlarged more or less diagrammatic fragmentary vertical sections, taken on the line A—A and the line B—B, respectively, of Figure 1, at the moment the exhaust port through the cylinder head and the cover plate is being opened by the valves.

In Figures 10–14, views "A" and "B" are similar to views "A" and "B", respectively, of Figure 9, but are taken:

In Figure 10, at the moment the exhaust port is fully open;

In Figure 11, at the moment the exhaust port is closing, and the intake port opening;

In Figure 12, at the moment the intake port is fully open;

In Figure 13, at the moment the intake port is closing and;

In Figure 14, at the moment at which firing occurs.

Referring particularly to Figures 1 to 6 of the drawings, the reference character 20 indicates an internal combustion engine of the multi-cylinder, four-stroke cycle type which includes a crankcase 21 which opens at its lower side into an oil sump 22. Seated on and suitably secured to the crankcase is a cylinder block 23 having therein a plurality of water-jacketed cylinders 24 which open at their lower ends into the crankcase.

In each of the cylinders is located a piston 25 to which is connected in any suitable manner the upper end of a connecting rod 26. Journalled in bearings 27 in the crankcase is the crankshaft 28 on which are formed cranks 29. The lower ends of the connecting rods 26 extend into the crankcase and have formed thereon bearings 30 in which the cranks 29 are journalled.

The upper ends of the cylinders are closed by a head 31, on one lateral side of which and integral therewith is formed a lip 32 which depends below the upper end of the cylinder block. The wall of the head on the side thereof on which the lip 32 is located is formed to present a plane, inclined outer surface 33 of which the outer surface of the lip forms a part. In the head 31, there are provided a plurality of combustion chambers 34 of which each opens into the upper end of one of the cylinders. Through the inclined wall of the head and into each of the combustion chambers extend a circular intake port 35 and a circular exhaust port 36 arranged side by side with the intake port. In order to attain simplicity in manifolding, the intake and exhaust ports in the odd-number cylinders are disposed in the reverse order longitudinally of the engine from those in the even-number cylinders. Each of the ports is preferably counterbored from its outer end to receive a sealing piston 37 of the type shown in Figures 1 to 4 of the application of George E. A. Hallet, S. N. 314,240, filed October 22nd, 1928. The head 31, and the lip 32 are, as shown in the drawings, provided with channels 38 and 39, respectively, for the passage of cooling water.

The partition members 40, which are secured to the outer surface of the wall 33, and the cover plate 41, which is secured to the partition members, define with the wall 33 a plurality of valve compartments 42 into each of which open the exhaust and inlet ports of one of the cylinders. The upper ends of the compartment 42 are closed by a cap member 43. Through the cover plate 41 extend intake and exhaust passages 44 and 45, respectively. Each of the exhaust passages 45 is axially aligned with and forms a continuation of one of the exhaust passages 36 in the cylinder head. Each of the intake passages 44 is axially aligned with and forms a continuation of one of the intake passages 35 in the cylinder head and is siamesed at its outer end with the adjacent intake passage in the cover plate, so that, as shown in the drawings, a single branch of the intake manifold serves two cylinders. A channel 46, which extends longitudinally of the engine, is provided in the cover plate for the passage of cooling water.

In each of the compartments 42, seated on the wall 33, and guided between the partition members 40 is a flat slide valve 47. Seated on the outer surface of the inner slide valve and on the inner wall of the cover plate 41, and also guided by the partition members 40, is a flat outer slide valve 48. Through the inner valve 47, and so located that they will be brought upon reciprocation of the valve periodically into registration with the intake passage 44—35 and with the exhaust passage 45—36, respectively, extend laterally spaced intake and exhaust ports 49 and 50, respectively. Through the outer valve 48, and so located that they will be brought upon reciprocation of the valves periodically into registration with the intake passage 44—35 and the intake port 49, and with the exhaust passage 45—36 and the exhaust port 50, respectively, extend laterally and longitudinally spaced intake and exhaust ports 51 and 52, respectively.

It will be noted that the side edges of each of the ports 49, 50, 51 and 52 are defined by straight lines parallel to the direction of movement of the valve and spaced apart a distance equal to the diameter of the circular ports in the cylinder head and cover plate and that one end edge of each of the ports is defined by a straight line perpendicular to the direction of movement of the valve. The other end edge of the port 51 is also defined by a straight line parallel to the first-mentioned end edge and at a distance therefrom equal to the diameter of the intake port in the cylinder head or cover plate. The other end edge of each of the ports 49, 50 and 52, i. e. the upper end edge of each of the ports 49 and 50 and the lower end edge of the port 52, is defined by an arc of a circle whose diameter is equal to that of the corresponding port in the cylinder head or cover plate and which is tangent to a line drawn parallel to the opposite end edge of the port at a distance therefrom equal to the diameter of the port in the cylinder head or cover plate. The reasons for and the advantages of thus peculiarly shaping the valve ports will be apparent after the manner in which the valves are operated to open and close the passages through the cylinder head and cover plate has been described.

On the lower end of each of the valves, there is formed a tongue or ear 53 to which is secured a bracket 54 which is pivotally connected to a member 55 by means of a pin 56 extending longitudinally of the engine. The member 55 is, in turn, pivoted to the upper end of a hollow, cylindrical crosshead 57 by means of pin 58 extending transversely of the engine. To an intermediate portion of the crosshead, there is pivoted, by means of the pin 59, the upper end of a connecting rod 60 which extends downwardly therefrom and is connected in any suitable manner to one of the cranks 61 on the eccentric shaft 62. The eccentric shaft 62 is journalled in bearings 63 in the crankcase and is adapted to be driven from the crankshaft by any suitable means, such as a chain passing over and meshing with the pinions 64 and 65.

For the purpose of guiding the movement of the crosshead, there is provided a hollow cylindrical member 66 in which the crosshead is slidably mounted. As shown in the drawings, the four guides for the crossheads of the valves of each pair of cylinders are formed in a single casting 67 which is secured to the cylinder block by screws 68.

The eccentric shaft 62, connecting rods 60, crossheads 57, and crosshead guides 66, it will be noted, are all located in a compartment 69 whose bottom wall 70 is trough-shaped and is formed integral with the crankcase and serves to separate the compartment 69 from the main crankshaft compartment. The outer lateral side of the compartment 69 is normally closed by cover plates 71 which are removable to allow access to the compartment.

During the operation of the engine, the force of the explosions in the cylinders 24 will cause rotation of the crankshaft 28 which, by reason of the connection between the crankshaft and eccentric shaft, will cause rotation of the latter. Rotation of the eccentric shaft will cause, through the intermediary of the connecting rods 60 and the crossheads, relative reciprocation of the outer and inner valves of each pair so as to open and close the intake and exhaust ports in the cylinder head to the intake manifold and exhaust manifold, respectively, at the proper moments to insure proper functioning of the engine. For reasons which will be apparent from the following description of the operation of the valves of one cylinder, it is preferred to operate the valves so as to cause them to open and close the ports in the manner illustrated in Figures 9 to 14.

From Figure 9(A), in which it is shown that the exhaust is opened by moving the upper edge of the exhaust port in the inner valve upwardly over the lower edge of the exhaust port in the cylinder head, and from Figure 11(A), in which it is shown that the exhaust port is closed by moving the lower edge of the exhaust port in the outer valve upwardly over the upper edge of the exhaust port in the cover plate, it will be seen that, by reason of the arcuate contour of the upper edge of the exhaust port in the inner valve, and the arcuate contour of the lower edge of the exhaust port in the outer valve, a substantial increase in the effective area of the exhaust opening during the exhaust period is effected, and the sharpness of the opening and closing action increased without changing either the time of opening or closing of the port and without increasing the area of the ports in the cylinder head and cover plate. From Figures 9, 10 and 11, it will be clear that the intake port in the cylinder remains closed during the entire exhaust period so as to effectually prevent the discharge of exhaust gases into induction system. From Figure 11(B), in which it is shown that the intake port is opened by moving the upper edge of the intake port in the outer valve upwardly over the lower edge of the intake port in the inner valve at the same time the lower edge of the intake port in the inner valve is moved downwardly over the upper edge of the intake port in the outer valve, and from Figure 13(B), in which it is shown that the intake port is closed by moving the upper edge of the intake port in the inner valve downwardly over the lower edge of the intake port in the cylinder head, it will be seen that, by reason of the fact that the intake period commences when the upper edge of the intake port in the outer valve and the lower edge of the intake port in the inner valve are located substantially in the plane of the axis of the intake ports in the cylinder head and cover plate, and, by reason of the arcuate contour of the upper edge of the intake port in the inner valve, a substantial increase in the effective area of the intake port during the intake period is effected and the sharpness of the opening and closing action increased without changing either the time of opening or closing of the port and without increasing the area of the ports in the cylinder head and cover plate. In Figure 11, it is shown that the exhaust port opens at substantially the same time the intake port closes and, from Figures 11, 12 and 13, it will be seen that, during all of the time that the intake port is open the exhaust port is closed, and that, during most of this time, the outer valve considerably overlaps the edge of the exhaust port in the cover plate so as to effectually prevent suction being applied to the exhaust manifold. From Figure 13, in which the valves are shown in the positions in which they are located shortly after the beginning of the compression stroke, it will be observed that, at the same time the intake port is closed by the inner valve and before the lower edge of the exhaust port in the outer valve moves downwardly over the upper edge of the exhaust port in the cover plate, the upper edge of the exhaust port in the inner valve moves downwardly over the lower edge of the exhaust port in the cylinder and so maintains the exhaust port closed during the entire compression stroke and prevents a portion of the combustible mixture being discharged into the exhaust manifold. From Figure 14, in which the valves are shown in the positions in which they are located when the explosion occurs, it will be noted that both of the ports in the cylinder head are closed by the inner valve, that both of the ports of the inner valve are at this time located below the ports in the cylinder head, and that at this time the inner valve is at approximately bottom dead center. This position of the inner valve at this time insures that, since neither of the ports of the inner valve is in registration with a port in the cylinder head, none of the gases in the cylinder can leak out between the valves, and furthermore, since the point of connection of the operating mechanism to the valve is at its greatest distance from the ports in the cylinder head, the portion of the valve against which the sealing pistons 37 bear will be affected to a minimum extent by any lateral movements which may be imparted to the valve by the operating mechanism and, therefore, that the seal effected between the sealing pistons and the inner valve will be much more nearly perfect than it would be if a lower part of the valve were in registration with the ports in the cylinder head when the explosion occurs.

Referring again to Figures 1 to 6 of the drawings, it will be seen that there is located in the oil sump 22 a pump casing 78 in which are located two gear-pumps, 79 and 80, operated by a single shaft 81 which is driven from the eccentric shaft through the gears 82 and 83. Both of the pumps are arranged to withdraw lubricant from the supply maintained in the oil sump 22. The pump 79 is of the high pressure type and has connected to its discharge side a conduit 84 which extends from the pump to the opposite end of the engine. From the conduit 84, there extend branches 85 which conduct lubricant to each of the crankshaft bearings 27 and branches 86 which conduct lubricant to each of the intermediate eccentric shaft bearings 63. Interiorly of each of the bearings 27, there is formed an annular groove 87 through which oil from the conduit 85 is circulated around the bearing. The crankshaft is drilled out, as indicated at 88, 89 and 90, to provide bores for conducting lubricant from the bearings 27 to the connecting rod bearings 30. There are also provided at the opposite ends of the engine bores 91 extending through webs in the crankcase and adapted to conduct lubricant from the annular grooves 87 in the end bearings 27 of the crankshaft to the end bearings 63 of the eccentric shaft.

The pump 80 is of the low pressure type and has connected to its discharge side a conduit 92 which opens at its opposite end into a bore 93 in a web in the crankcase. The bore 93 opens through the upper side of the crankcase into a conduit 94 which, in turn, opens into a manifold 95 extending longitudinally of the engine at approximately the level of the center of the crosshead guides 66. Surrounding the manifold opposite each adjacent pair of crosshead guides and secured to the manifold and to the guides is a member 96 having therein bores 97, each of which communicates with the interior of the manifold and with an upwardly inclined bore 98 which opens into the interior of the crosshead guide at such a point that, as shown in Figure 3, it is uncovered by the crosshead each time it approaches its lower dead center.

During the operation of the engine, the high pressure pump 79 withdraws lubricant from the oil sump 22 and forces it into the conduit 84, whence a portion of it passes through the conduits 85 to the crankshaft bearings 27, and another portion of it passes through the conduits 86 to the intermediate eccentric shaft bearings 63. The lubricant flows around each of the crankshaft bearings 27 through the annular groove 87, whence from the intermediate bearings it flows through the passages 88, 89 and 90 to the intermediate connecting rod bearings 30, and whence from the end crankshaft bearings a portion of it flows through the passages 88, 89 and 90 to the end connecting rod bearings and a portion of it flows through the passages 91 to the end eccentric shaft bearings 63. The excess lubricant from the eccentric shaft bearings overflows into the trough 70.

During the operation of the engine, the low pressure pump 80 withdraws lubricant from the oil sump 22 and discharges it into the conduit 92, whence it passes through the manifold passage 93 and the conduit 94 to the manifold 95 and a certain amount of it works in between the crossheads and the crosshead guides and lubricates these bearing surfaces. From the manifold 95, each time one of the crossheads reaches its bottom dead center position and uncovers the corresponding opening 98, a volume of lubricant is squirted onto the lower end of the corresponding valve and during the following reciprocatory movement of the valves a portion of it is distributed over their bearing surfaces. The excess lubricant drips off the valves onto and lubricates the bearings 56, 58, the crosshead guide 66 and the upper connecting rod bearing 59. The excess lubricant from these bearings falls into the trough 70.

The lubricant overflowing from the eccentric shaft bearings 63 and the lubricant dripping from the valves will form, in the trough 70, a pool whose level is maintained substantially constant by an overflow opening through which the excess may be returned to the oil sump 22. Into the pool of oil in the trough 70, the lower eccentric shaft connecting rod bearings will dip upon rotation of the eccentric shaft and thus be supplied with lubricant.

Several of the advantages of the engine hereinbefore described may well be mentioned here. The use of crossheads and crosshead guides of the construction hereinbefore described eliminates any lateral strain on the valves or lateral movement on the part of the valves due to connecting rod movement and thereby eliminates breakage of valves and admits of better port sealing and, furthermore, provides a construction in which, as is evident, the very important feature of a means to supply a measured and definite supply of lubricant to the valves may be incorporated. By providing the universal joint type of connection, hereinbefore described, between the crosshead and the valve, strain on the valve, due to slight inaccuracies in the dimensions of parts or in the path of the crosshead, is prevented. The provision of the wall 70, which separates the compartment 69 from the main crankshaft compartment, prevents oil from the sump 22 being splashed on the valves, which would render ineffective the hereinbefore described means for supplying a measured amount of lubricant to the valves.

The engine shown in Figures 7 and 8 is similar to and operates in the same manner as the engine shown in the other figures with the exception of the apparatus for lubricating the valves. In Figures 7 and 8, this apparatus includes a closed conduit 100 extending the entire length of the engine, or a plurality of closed conduits 100 each extending a portion of the length of the engine, located in a rabbet 101 formed in the lower inner edge of the cover plate 102. From the discharge side of the low pressure lubricant pump in the oil sump and opening into the conduit, or into each of the conduits 100, extends a pipe 103. To conduct lubricant from the conduit 100 to the valves 47 and 48, there is provided a discharge pipe 104 leading from the conduit 100 to a point substantially on the median line of each pair of valves, closely adjacent to the outer face of the outer valve, and at such a height that during the operation of the valves it will be in a position to alternately discharge lubricant on the outer face of one valve, on the outer face of the other valve, and then into the space between the tongues 53 on the valves, as illustrated in Figure 7. Flow of lubricant to the valves from the conduit 100 is accomplished by gravity alone, a suitable overflow device 105 being provided to prevent pressure being built up in the conduit 100.

The excess lubricant discharged on the valves drains onto and lubricates the bearings 56, 58 and 59 and the crosshead guide and the remainder, together with the lubricant discharged from the overflow pipe 105, drains into the trough 70 where, with the oil overflowing from the eccentric shaft bearings it forms a pool for the lubrication of the lower eccentric shaft connecting rod bearings. As in the engine previously described, there is provided in the trough 70 an overflow opening through which the lubricant rising above a predetermined level in the trough 70 is returned to the oil sump 22.

Although I have shown and described preferred embodiments of my invention, it is to be understood that this has been done merely by way of example, and that the scope of my invention is defined only by the appended claims.

I claim:

1. In an internal combustion engine, a cylinder, a wall having therethrough adjacent circular intake and exhaust ports opening into the cylinder, a wall spaced from the first-mentioned wall so as to form therebetween a valve chamber and having therethrough circular intake and exhaust ports in axial alignment with the intake and exhaust ports in the first-mentioned wall, a reciprocating valve through which extend a pair of ports whose outer transverse edges are of arcuate contour mounted to slide in the chamber adjacent the first mentioned wall, a reciprocating valve through which extend a pair of ports, one having an inner transverse edge of arcuate contour mounted to slide in the chamber adjacent the second mentioned wall and means to operate the valves so as to open the exhaust port by moving the outer edge of one of the ports in the first-mentioned valve over the inner edge of the exhaust port in the first-mentioned wall, to close the exhaust port by moving the inner edge of the second-mentioned port in the second-mentioned valve over the outer edge of the exhaust port in the second-mentioned wall, to open the intake port by simultaneously moving opposite edges of the other ports in the valves over each other when those edges are located intermediate the inner and outer edges of the intake ports in the walls, and to close the intake port by moving the outer edge of the last-mentioned port in the first-mentioned valve over the inner edge of the intake port in the first-mentioned wall.

2. In an internal combustion engine, a crankcase, a crankshaft journalled in bearings in the crankcase, an eccentric shaft journalled in bearings in the crankcase, connecting rods journalled on cranks on the eccentric shaft, a lubricant pump, means for conducting lubricant from the pump to the crankshaft bearings, means to conduct lubricant from the crankshaft bearings to the eccentric shaft bearings, a trough located beneath the eccentric shaft bearings in such a position that it is adapted to receive the overflow of lubricant from the eccentric shaft bearings so as to form therein a pool of lubricant from which the connecting rod bearings are adapted to receive lubricant upon rotation of the eccentric shaft.

3. In an internal combustion engine, a crankcase, a crankshaft journalled in bearings in the crankcase, an eccentric shaft journalled in bearings in the crankcase, connecting rods journalled on cranks on the eccentric shaft, a lubricant pump, means for conducting lubricant from the pump to the crankshaft bearings, means to conduct lubricant from the crankshaft bearings to certain of the eccentric shaft bearings, means to conduct lubricant from the first-mentioned means to others of the eccentric shaft bearings, a trough positioned beneath the eccentric shaft bearings in such a position that is adapted to receive the overflow from the eccentric shaft bearings so as to form therein a pool of lubricant from which the connecting rod bearings are adapted to receive lubricant upon rotation of the eccentric shaft.

4. In an internal combustion engine, a reciprocating valve, means for operating said valve, including a crosshead and a crosshead guide, and means associated with the crosshead and crosshead guide to supply lubricant periodically to the valve.

5. In an internal combustion engine, a plurality of cylinders, a reciprocating valve for each cylinder, means for operating the valves, including a crosshead connected to each valve, means for guiding the crossheads and means for supplying lubricant periodically to each of the valves, including a lubricant manifold associated with the crossheads and crosshead guides.

6. In an internal combustion engine, a reciprocating valve, and means to operate the valve, including a crosshead, a crosshead guide having therethrough an opening adapted to be uncovered by the crosshead each time it reaches the inner end of its stroke, a lubricant pump, means for conducting lubricant from the pump to said opening so that when the opening is uncovered lubricant is forced therethrough onto a portion of the valve.

7. In an internal combustion engine, a crankshaft, a reciprocating valve, means to supply a metered amount of lubricant to the valve, and means to prevent lubricant being splashed by the crankshaft onto the valve.

8. In an internal combustion engine, a crankshaft, valve, a valve operating shaft, a high pressure lubricant pump for supplying lubricant to the crankshaft bearings and the valve operating shaft bearings, and a low pressure lubricant pump for supplying lubricant to the valves.

9. In an internal combustion engine, a pair of superposed relatively reciprocating slide valves, and means for supplying lubricant to the valves, including a discharge conduit so located as to alternately, during the operation of the valves, discharge lubricant on one valve, then on the other valve, and then into a space occupied by neither of the valves.

10. In an internal combustion engine, a crank case, a crank shaft journalled in bearings in the crank case, an eccentric shaft journalled in bearings in the crank case, connecting rods journalled on cranks on the eccentric shaft, valves connected to the connecting rods, a lubricant pump, means for conducting lubricant from the pump to the crank shaft bearings, means to conduct lubricant from the crank shaft bearings to certain of the eccentric shaft bearings, means to conduct lubricant from the first mentioned means to others of the eccentric shaft bearings, a second lubricant pump, means for conducting lubricant from the second mentioned pump to the valves, a trough positioned beneath the eccentric shaft bearings in such a position that it is adapted to receive the overflow from the valves and the eccentric shaft bearings so as to form therein a pool of lubricant from which the connecting rod bearings are adapted to receive lubricant upon rotation of the eccentric shaft.

11. The combination of a reciprocating part and a part to be supplied with lubricant, of means to guide the reciprocating part, and means associated with the guide and the reciprocating part to supply lubricant periodically to the part to be supplied with lubricant.

12. A fluid metering device which consists of a reciprocating part, a guide for the reciprocating part, and an opening in the guide adapted to be uncovered periodically by the reciprocating part and through which fluid is adapted to be discharged.

13. In an internal combustion engine, a valve casing, a reciprocating valve slidably mounted in the casing and of which a portion is adapted to be projected periodically from the casing, and means to discharge lubricant onto the portion of the valve when it is projected from the casing.

In testimony whereof I affix my signature.

GEORGE P. BERRY.